US008732218B2

(12) United States Patent
Takenaka (10) Patent No.: US 8,732,218 B2
(45) Date of Patent: May 20, 2014

(54) FILE ACCESS SYSTEM (75) Inventor: Maiko Takenaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 902 days.

(21) Appl. No.: 12/263,339

(22) Filed: Oct. 31, 2008

(65) Prior Publication Data

US 2009/0125525 A1 May 14, 2009

(30) Foreign Application Priority Data

Nov. 13, 2007 (JP) ................................. 2007-294589

(51) Int. Cl.
*G06F 7/00* (2006.01)
*H04N 1/32* (2006.01)

(52) U.S. Cl.
CPC .............................. *H04N 1/32128* (2013.01)
USPC .......................... 707/822; 707/758; 707/812

(58) Field of Classification Search
CPC .................................................. H04N 1/32128
USPC ........................................ 707/758, 812, 822
See application file for complete search history.

(56) References Cited

U.S. PATENT DOCUMENTS

| | | | | |
|---|---|---|---|---|
| 5,806,072 | A * | 9/1998 | Kuba et al. ............................ 1/1 |
| 6,289,164 | B1 * | 9/2001 | Hori et al. ...................... 386/328 |
| 6,763,139 | B1 * | 7/2004 | Andrew ......................... 382/240 |
| 6,996,618 | B2 * | 2/2006 | Apostolopoulos et al. ... 709/227 |
| 7,006,695 | B2 | 2/2006 | Yamada |
| 7,231,092 | B2 | 6/2007 | Yamada |
| 7,945,544 | B2 * | 5/2011 | Farber et al. .................. 707/698 |
| 2002/0069218 | A1 * | 6/2002 | Sull et al. ................... 707/501.1 |
| 2003/0099404 | A1 * | 5/2003 | Koide ............................ 382/240 |
| 2004/0175046 | A1 * | 9/2004 | Gormish ...................... 382/232 |
| 2005/0012963 | A1 | 1/2005 | Yamads |
| 2007/0271253 | A1 * | 11/2007 | Lebrat ............................... 707/5 |

FOREIGN PATENT DOCUMENTS

| | | |
|---|---|---|
| JP | A 2003-114814 | 4/2003 |
| JP | A 2003-179760 | 6/2003 |
| JP | A 2005-223391 | 8/2005 |

OTHER PUBLICATIONS

PDF Reference, Adobe Portable Document Format, Version 1.6 Adobe Systems Incorporated 1985-2004 fifth edition, pp. 1-.
Information Technology—JPEG 2000 Image Coding System—Part 1 final Draft International Standard, Aug. 18, 2000, pp. i-236.
Information Technology—JPEG 2000 Image Coding System—Part 6: Compound Image File Format; Dec. 9, 2002; 71 pgs.

(Continued)

*Primary Examiner* — Cheyne D Ly
(74) *Attorney, Agent, or Firm* — Blakely, Sokoloff, Taylor & Zafman LLP (57) ABSTRACT

A disclosed file access system is capable of receiving each of code data from a server apparatus and updating a local file without increasing the processing time upon receiving the code data as the number of received code data is increased. The file access system includes a header data receiving unit receiving header data; a header data writing unit writing the header data into the local file; a code data receiving unit receiving designated code data from among the code data; a storage area allocating unit allocating a storage area with respect to the local file so that the code data received by the code data receiving unit can be written from the same starting position of the local file as that of the original file; and a code data writing unit writing the code data from the position of the local file.

7 Claims, 10 Drawing Sheets

(56) References Cited

OTHER PUBLICATIONS

Information Technology—JPEG 2000 Imade Coding System—Part 9: Interactivity tools, APIs and protocols; International Standard; Mar. 30, 2004; 142 pgs.

Information Technology—JPEG 2000 Image Coding System—Part 2: Extensions, Final Draft International Standard; Aug. 8, 2001, 366 pgs.

Information Technology—JPEG 2000 Image Coding System—Part 3: Motion JPEG 2000, Coding Still Pictures; International Standard 1.0; Feb. 28, 2006; 51 pgs.

* cited by examiner

FILE ACCESS SYSTEM

PRIORITY

Embodiments of the present application claims priority under 35 U.S.C §119 to Japanese Patent Application Publication No. 2007-294589 filed Nov. 13, 2007, the entire contents of which are hereby incorporated herein by reference.

BACKGROUND OF THE INVENTION

1. Field of the Invention

The present invention generally relates to a file access system, and more specifically to a file access system capable of receiving code data of an original file including plural code data from a server apparatus and updating a local file in the file access system based on the received code data.

2. Description of the Related Art

Conventionally, there has been known a file access system (see for example Japanese Patent Application Publication No. 2003-179760) in which, before fragmented code data in a prescribed format from a server apparatus are received, the header data of image data are received from the server apparatus. Based on the received header data, a number of tiles of the image data and the necessary number of the code data to constitute all of the tiles are calculated. The same number of one-byte-length dummy code data as those of the code data are created with respect to each of the calculated tiles. Then, among the dummy code data, dummy code data corresponding to the data actually received from the server apparatus are replaced by the data received from the server apparatus.

In such a conventional file access system, however, it may be required to update a starting position and the size of each code data included in header data and to shift the replacement code data when the code data are received. This may cause a problem in that the processing time when code data is received may be disadvantageously increased as the number of code data is increased.

SUMMARY OF THE INVENTION

A file access system is described. In one embodiment, a file access system, which is capable of being connected to a server apparatus storing an original file including plural code data and header data having information items indicating the starting position and the size of the corresponding code data, and receiving each of the code data from the server apparatus and updating a local file, comprises a header data receiving unit to receive the header data; a header data writing unit to write the header data into the local file; a code data receiving unit to receive designated code data from among the code data; a storage area allocating unit to allocate a storage area with respect to the local file so that each of the code data received by the code data receiving unit can be written from a same starting position of the local file as that of the original file; and a code data writing unit to write each of the received code data from the same starting position of the local file.

BRIEF DESCRIPTION OF THE DRAWINGS

Other embodiments, features, and advantages of the present invention will become more apparent from the following description when read in conjunction with the accompanying drawings, in which.

DETAILED DESCRIPTION OF THE PREFERRED EMBODIMENTS

According to an embodiment of the present invention, there is provided a file access system capable of being connected to a server apparatus storing an original file including plural code data and header data having information items indicating the starting position and the size of each code data, and receiving each of the code data from the server apparatus and updating a local file. The file access system includes a header data receiving unit receiving the header data; a header data writing unit writing the header data into the local file; a code data receiving unit receiving designated code data from among each of the code data; a storage area allocating unit allocating a storage area with respect to the local file so that the code data received by the code data receiving unit can be written from the same starting position of the local file as that of the original file; and a code data writing unit writing the code data from the same starting position of the local file.

Because of this structure, the file access system of one embodiment of the present invention starts writing the received code data from the same starting position of the local file as that in the original file. By doing this, it becomes unnecessary to update the contents of the information items indicating the starting position and the size of each code data included in the header data upon receiving the code data and to shift the replacement code data, thereby enabling controlling the increase of the processing time upon receiving code data as the number of received code data is increased.

According to an embodiment of the present invention, a file access system controls the increase of the processing time upon receiving code data as the number of received code data is increased.

In the following, embodiments of the present invention are described with reference to the accompanying drawings. In the descriptions, it is assumed that the file access system receives each code data of an original file from a server apparatus and updates a local file based on the received code data.

Further, in the descriptions, the term "original file" refers to a file including continuous plural code data and header data including the starting position and the size of each code data. The original file may be a JPEG 2000 file in Joint Photographic Experts Group (JPEG) 2000 format defined by ISO/IEC-15444, a Portable Document Format (PDF) file developed by Adobe Systems, a Tagged Image File Format (TIFF) file, or the like.

Further, in the following descriptions, the JPEG 2000 file, especially, a JPEG 2000 File Format—Multilayer (JPM) file is exemplified as the original file. However, it should be noted that the file format that may be used in the file access system according to an embodiment of the present invention is not limited to this specific file format.

First Embodiment

A file access system according to a first embodiment of the present invention is described with reference to FIG. 1.

Figure 1:
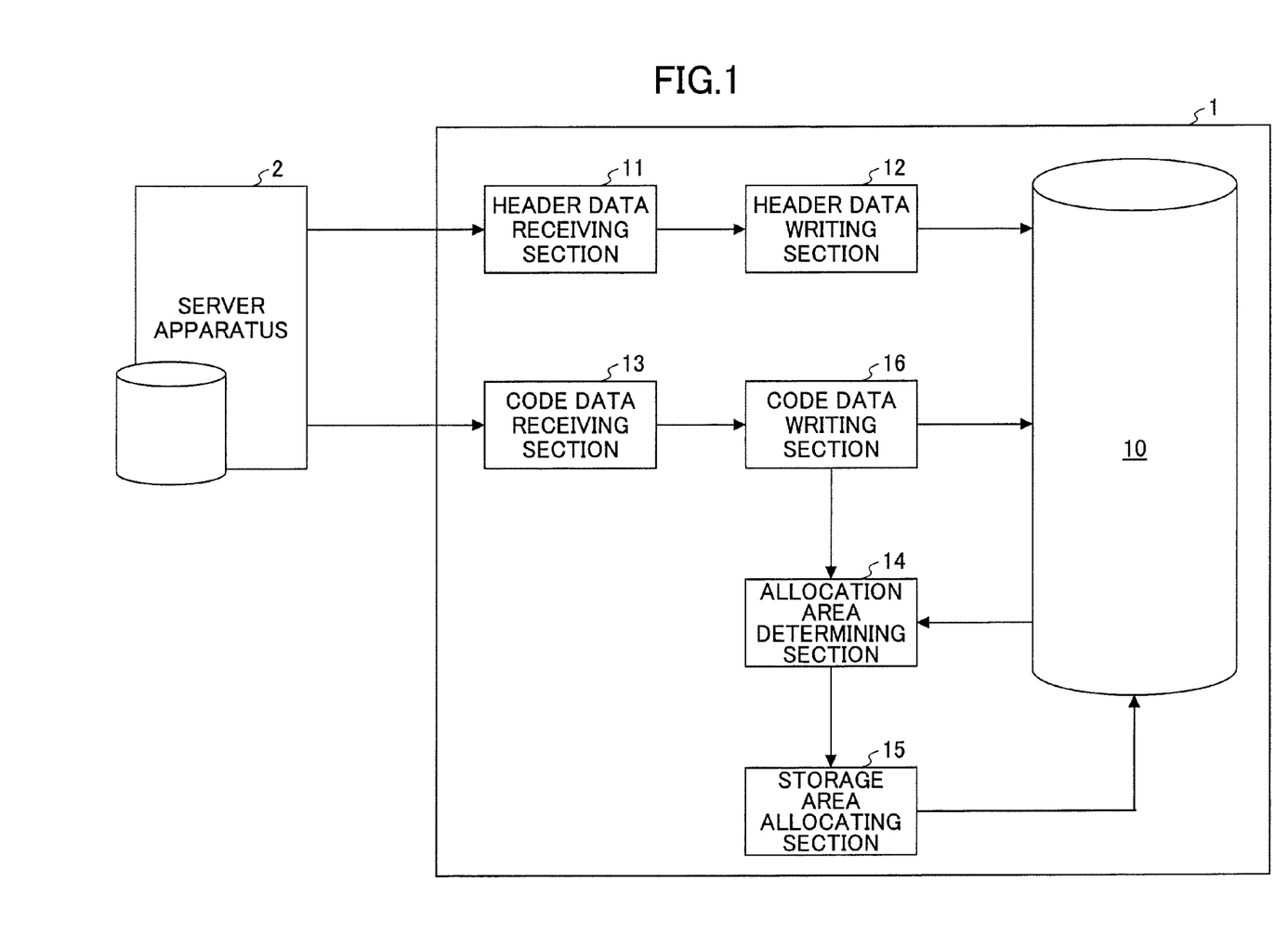
FIG. 1 is a block diagram showing an exemplary configuration of a file access system according to a first embodiment of the present invention.

FIG. 1 shows a file access system 1 according to the first embodiment of the present invention. As shown in FIG. 1, the file access system 1 includes a file storage unit 10, a header data receiving unit 11, a header data writing unit 12, a code data receiving unit 13, an allocation area determining unit 14, a storage area allocating unit 15, and a code data writing unit 16. The file storage unit 10 stores a local file. The header data receiving unit 11 receives header data of an original file in a server apparatus 2 connected to the file access system 1 via a network. The header data writing unit 12 writes the header data into a local file in the file storage unit 10. The code data receiving unit 13 receives designated code data of an original file. The allocation area determining unit 14 determines whether a necessary storage area for storing the code data into a local file is allocated with respect to the local file. The code data are received by the code data receiving unit 13. The storage area allocating unit 15 allocates the storage area with respect to the local file when it is determined that the storage area is not allocated with respect to the local file. The code data writing unit 16 writes the code data received by the code data receiving unit 13 into the local file.

Figure 2:
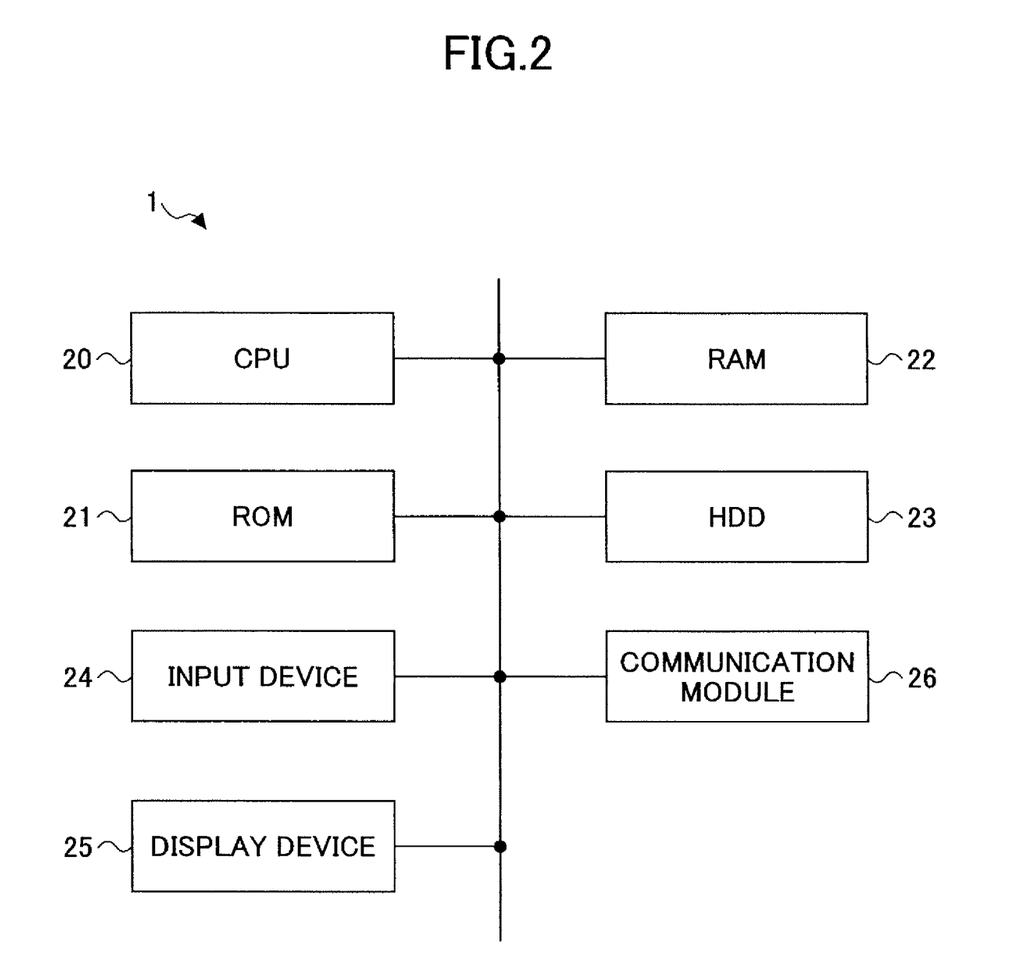
FIG. 2 is a block diagram showing an exemplary hardware configuration of the file access system according to the first embodiment of the present invention.

From the hardware point of view, as shown in FIG. 2, the file access system 1 may be a computing system including a Central Processing Unit (CPU) 20, a Read Only Memory (ROM) 21, a Random Access Memory (RAM) 22, a hard disk device (HDD) 23, an input device 24 such as a keyboard and a pointing device, a display device 25 using such as a liquid crystal display, and a communication module 26 to communicate with a system on a network.

Some programs are stored in the ROM 21 or the HDD 23 so that the programs cause the computing system to work as the file access system 1. The CPU 20 controls each part of the file access system 1 by loading the program from the ROM 21 or the HDD 23 into the RAM 22 to execute the program.

The file storage unit 10 may be constituted by the HDD 23. Each of the header data receiving unit 11 and the code data receiving unit 13 may be constituted by the communication module 26. Further, each of the header data writing unit 12, the allocation area determining unit 14, the storage area allocating unit 15, and the code data writing unit 16 may be constituted by the CPU 20.

Figure 3:
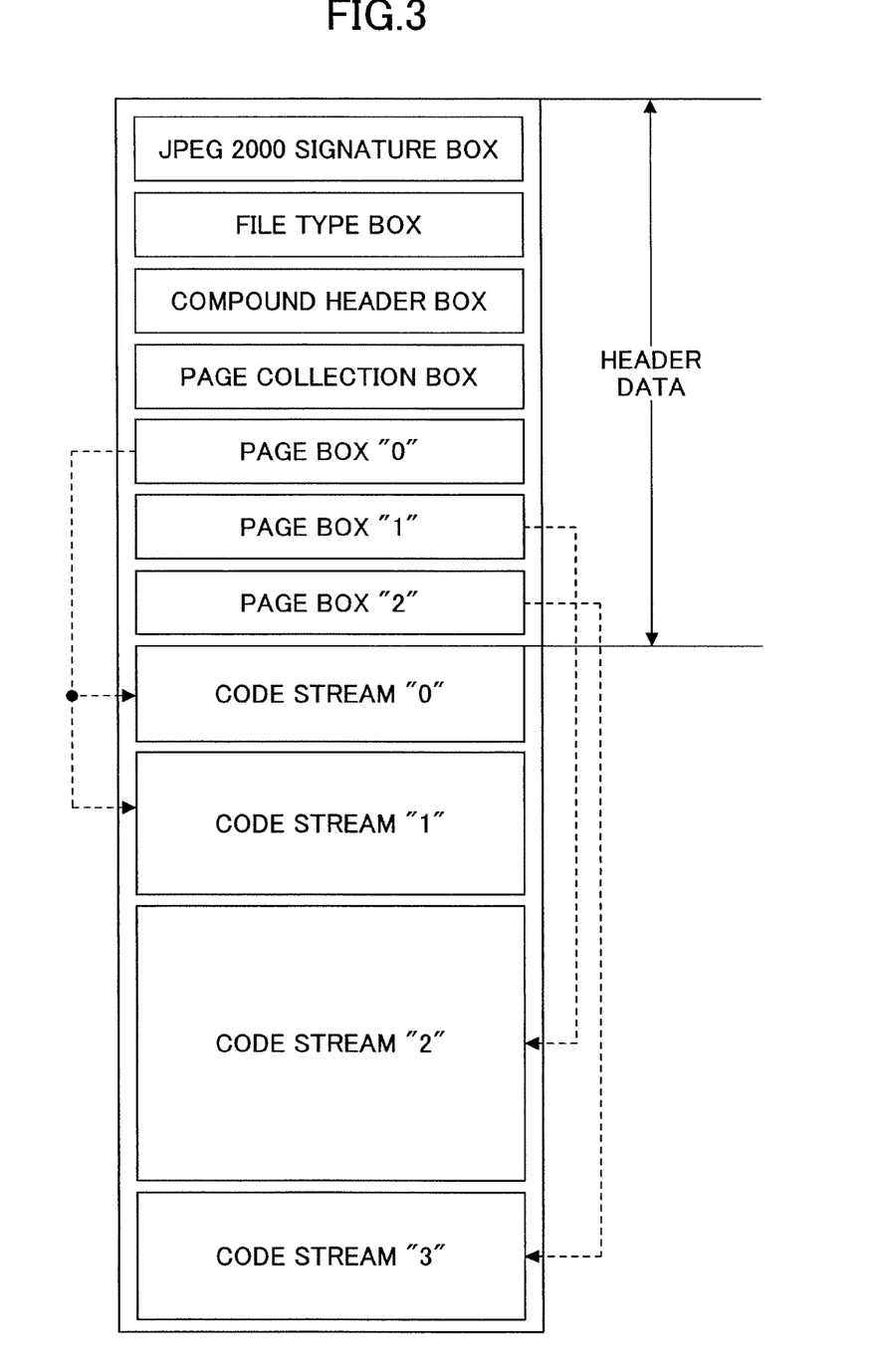
FIG. 3 is a configuration diagram showing a configuration of an original file used for the file access system according to the first embodiment of the present invention.

FIG. 3 is a drawing showing a configuration of the original file used for the file access system according to the embodiment of the present invention. As shown in FIG. 3, a simplified JPM file is exemplified as the original file in the server apparatus.

As shown in FIG. 3, the original file includes a JPEG 2000 Signature box, a file type box, a compound header box, a page collection box, at least one page box, and at least one code stream.

The JPEG 2000 Signature box includes the information indicating that the original file is a JPEG-2000 file. The file type box includes the information items indicating the file type, the version, the compatibility, and the like of the original file. Further, the compound header box includes general information of the image data in the original file.

The page collection box includes the information item for managing the pages of the image of the original file. Each page box includes the information item indicating one page of the image data in the original file. Each code stream includes encoded image data.

In a typical JPM file, each page box includes at least one layout object box; each layout object box includes at least one object box; and there is correspondence between the object box and the code stream.

However, in this embodiment, to be able to understand the technique of the embodiment easily, it is assumed that each page box directly corresponds to the code stream(s) and includes the information indicating the starting position and the size of the corresponding code stream(s). The term "starting position" herein refers to an offset value from the top of the original file.

In the state of FIG. 3, the page box "0" corresponds to the code streams "0" and "1". In the same manner, the page boxes "1" and "2" corresponds to the code streams "2" and "3", respectively.

Further, in the descriptions, all the information stored before (on the upper side of) the code streams in the original file configuration, i.e. the JPEG 2000 Signature box, the filter type box, the compound header box, the page collection box, and the page box, may be generically called "header data". In the same manner, each code stream may be called "code data".

Next, referring back to FIG. 1, the function of each element of the file access system 1 is described. The header data receiving unit 11 sends a request to the server apparatus 2 to transmit the header data of the original file designated via the input device 24 or the like, and receives the header data from the server apparatus 2 as the response to the request.

When the header data receiving unit 11 receives the header data, the header data writing unit 12 generates a local file in the file storage unit 10, and allocates a storage area having a capacity equal to or greater than the size of received header data in the local file in the file storage unit 10. Further, the header data writing unit 12 writes the header data received by the header data receiving unit 11 into the local file in the file storage unit 10.

The code data receiving unit 13 sends a request to the server apparatus 2 to transmit each code data corresponding to a page designated via the input device 24 or the like from among all the code data of the original file, and receives the code data from the server apparatus 2 as the response to the request.

The allocation area determining unit 14 determines whether the storage area of the local file is properly allocated so that the code data received by the code data receiving unit 13 can be fully written from the same starting position of the local file as that of the original file.

When it is determined that the storage area is not properly allocated, namely, when it is determined that the code data received by the code data receiving unit 13 cannot be fully written from the same starting position of the local file as that of the original file, the storage area allocating unit 15 allocates (expands) the capacity of the storage area of the local file in a manner so that the ending position of the code data of the local file is the same as that of the code data of the original file. The code data writing unit 16 writes the code data received by the code data receiving unit 13 into the local file from the same starting position as that of the original file.

Figure 4:
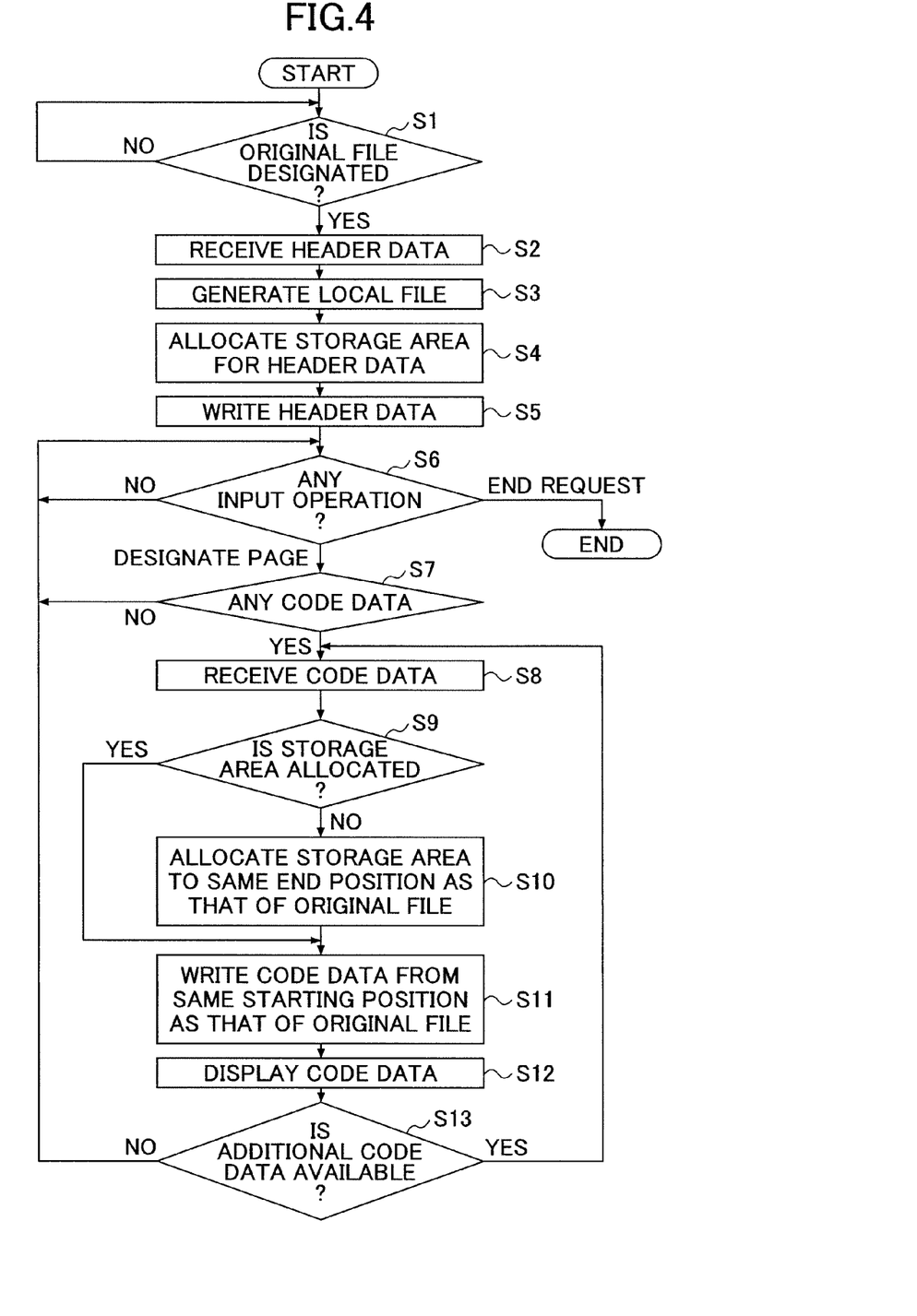
FIG. 4 is a flowchart showing the operations of the file access system according to the first embodiment of the present invention.

Next, the operations of the file access system 1 are described with respect to FIG. 4.

First, one original file is designated from among the files in the server apparatus 2 via the input device 24 or the like (step S1). Then, the header data receiving unit 11 sends a request to the server apparatus 2 to transmit the header data of the designated original file, and receives the header data from the server apparatus 2 as the response to the request (step S2).

Next, the header data writing unit 12 generates a local file in the file storage unit 10 (step S3), and allocates a storage area having a capacity equal to or greater than the size of received header data in the local file in the file storage unit 10 (step S4).

Next, the header data writing unit 12 writes the header data received by the header data receiving unit 11 into the local file in the file storage unit 10 (step S5).

Next, the input device 24 is operated (step S6). When the operation is to end, the operations of the file access system 1 terminate. On the other hand, when the operation is to designate a page, the code data receiving unit 13 determines whether the code data corresponding to the designated page is available (step S7).

When it is determined that the code data is not available, the process goes to step S6 to wait for the next operation. On the other hand, when determined that the code data is available in step S7, the code data receiving unit 13 sends a request to the server apparatus 2 to transmit the code data corresponding to the designated page, and receives the code data from the server apparatus 2 as the response to the request (step S8).

Next, the allocation area determining unit 14 determines whether the storage area of the local file is properly allocated so that the code data received by the code data receiving unit 13 can be fully written from the same starting position in the local file as that in the original file (step S9).

When it is determined that the storage area is not properly allocated, namely, when it is determined that the code data received by the code data receiving unit 13 cannot be fully written from the same starting position in the local file as that in the original file, the storage area allocating unit 15 allocates (expands) the capacity of the storage area of the local file in a manner so that the ending position of the code data of the local file is the same as that of the code data of the original file (step S10).

After the storage area has been fully allocated (expanded) in the local file, the code data writing unit 16 writes the code data received by the code data receiving unit 13 into the local file from the same starting position as that of the original file (step S11).

After the code data received by the code data receiving unit 13 have been stored, the code data are decoded by the CPU 20, a video card (not shown), or the like, and displayed on the display device 25 (step S12).

Then, the code data receiving unit 13 determines whether there are the next code data corresponding to the designated page (step S13). When determined that there are additional code data, the operations of the file access system 1 goes back to step S8 to receive the next code data by the code data receiving unit 13. When determined that there are no additional code data, the operation of the file access system 1 goes back to step S6 to wait for the next operation of the input device 24.

Figure 5:
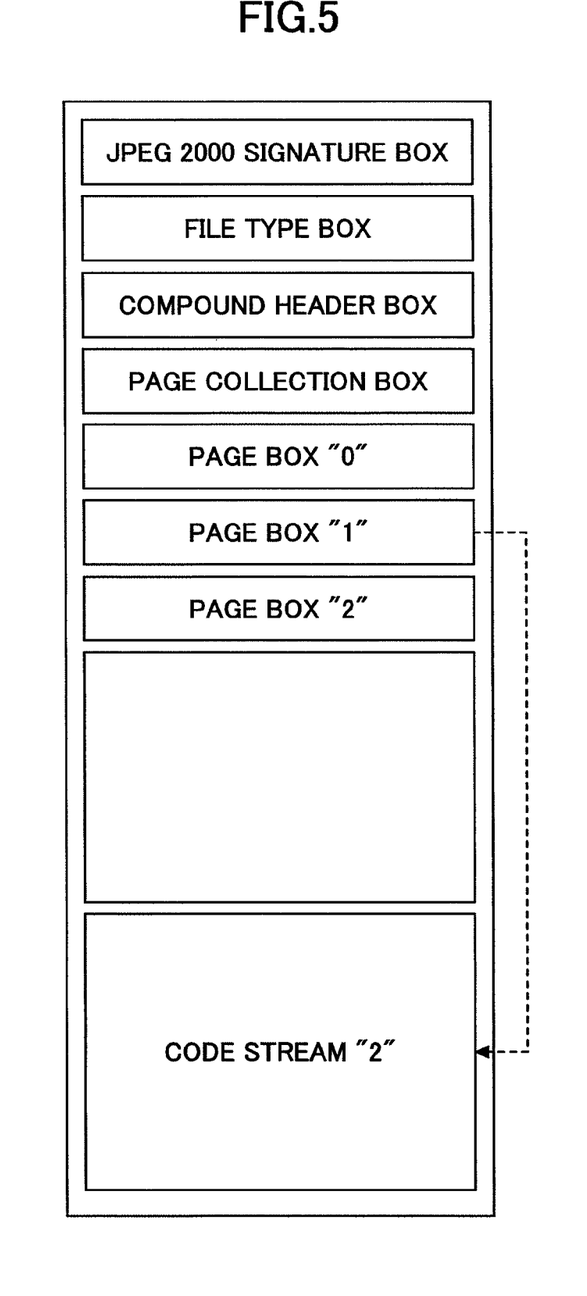
FIG. 5 is a configuration diagram showing a first state of a local file updated by the file access system according to the first embodiment of the present invention.

For example, a case is described where a second page (page box "1") is designated with respect to the original file of FIG. 3. In this case, in the local file, as shown in FIG. 5, a storage area having a capacity for storing the code streams "0" through "2" is allocated so that the code stream "2" can be stored in the storage area beneath the storage area for storing the code streams "0" and "1". Then, the code stream "2" corresponding to the page box "1" is stored in the storage area beneath the storage area for storing the code streams "0" and "1".

Figure 6:
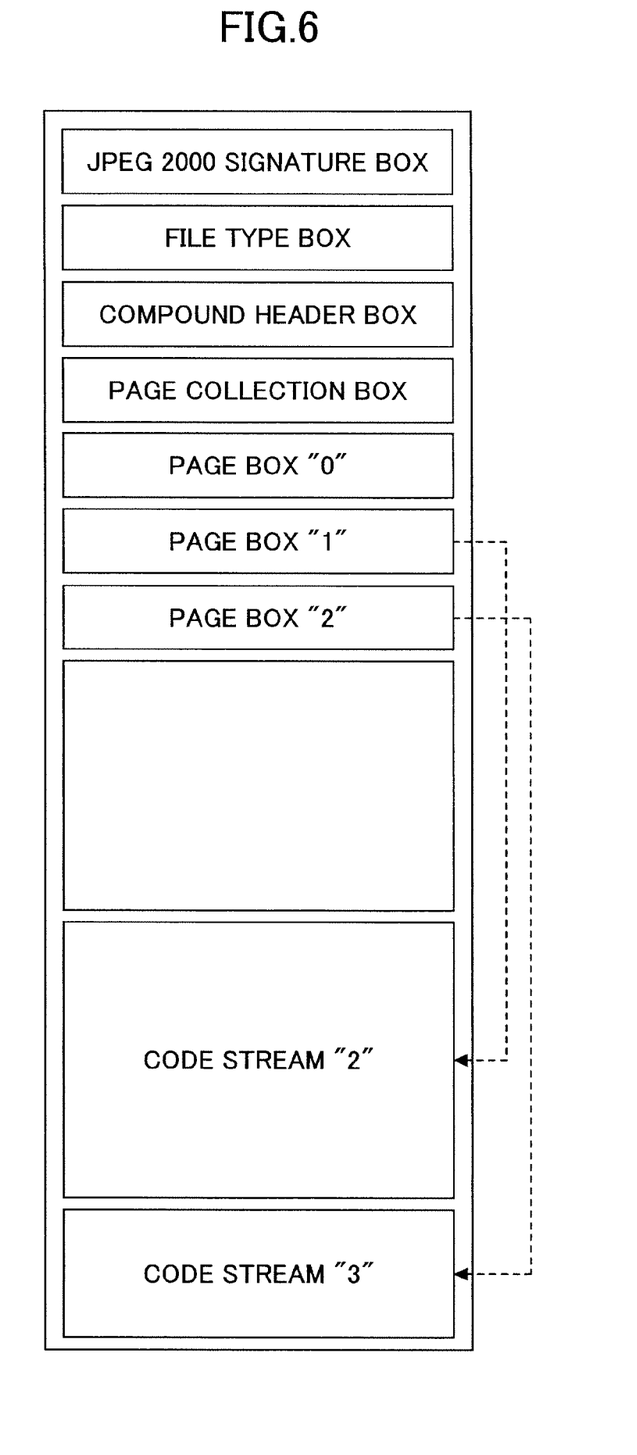
FIG. 6 is a configuration diagram showing a second state of the local file updated by the file access system according to the first embodiment of the present invention.

Next, a case is described where a third page (page box "2") is designated. In this case, in the local file, as shown in FIG. 6, the storage area for storing the code stream "3" is allocated. Then, the code stream "3" corresponding to the page box "2" is stored in the storage area beneath the storage area storing the code stream "2".

As described above, advantageously, in the file access system 1, the received code data may be stored from the same starting position in the local file as that in the original file. Because of this feature, it becomes unnecessary to update the contents of the information items indicating the starting position and the size of each code data included in the header data upon receiving the code data and to shift the code data that has been replaced, thereby enabling controlling the increase of the processing time upon receiving code data as the number of received code data is increased.

Second Embodiment

Next, a file access system according to a second embodiment of the present invention is described with reference to FIG. 7. It should be noted that in the second embodiment, the same reference numerals are commonly used for the same elements in the first embodiment, and the descriptions of the same elements are omitted.

Figure 7:
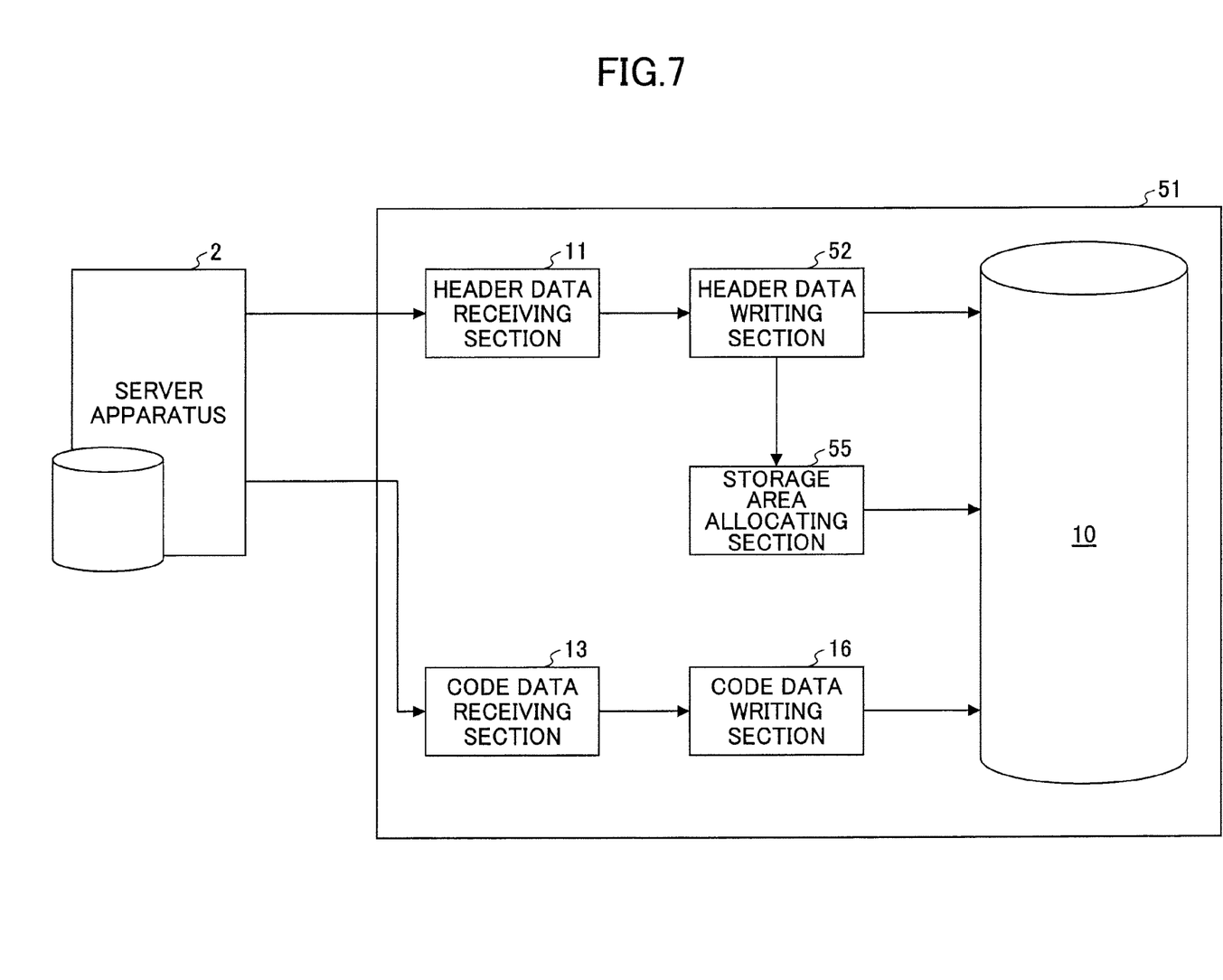
FIG. 7 is a block diagram showing an exemplary configuration of a file access system according to a second embodiment of the present invention.

FIG. 7 shows a file access system 51 according to the second embodiment of the present invention. As shown in FIG. 7, the file access system 1 includes a file storage unit 10, a header data receiving unit 11, a header data writing unit 52, a code data receiving unit 13, a storage area allocating unit 55, and a code data writing unit 16. The file storage unit 10 stores a local file. The header data receiving unit 11 receives header data of the original file in the server apparatus 2 connected to the file access system 1 via a network. The header data writing unit 52 writes the header data into the local file in the file storage unit 10. The code data receiving unit 13 receives designated code data of the original file. The storage area allocating unit 55 allocates the storage area in the local file so that the storage area has the same capacity (size) as that of the original file. The code data writing unit 16 writes the code data received by the code data receiving unit 13 into the local file.

From the hardware point of view, the hardware configuration of the file access system 51 is the same as that of the file access system 1 described with reference to FIG. 1. It should be noted that in this embodiment, the programs causing the computing system to work as the file access system 51 are stored in the ROM 21 or the HDD 23. Further, each of the header data writing unit 52 and the storage area allocating unit 55 is constituted by the CPU 20.

In FIG. 7, when the header data receiving unit 11 receives the header data, the header data writing unit 52 generates a local file in the file storage unit 10. Further, after a storage area in the local file has been allocated, the header data writing unit 52 writes the header data received by the header data receiving unit 11 into the local file in the file storage unit 10.

After the header data receiving unit 11 receives the header data and the header data writing unit 52 generates the local file, the storage area allocating unit 55 allocates the storage area in the local file in the file storage unit 10 so that the size of the storage area is the same as that of original file.

Figure 8:
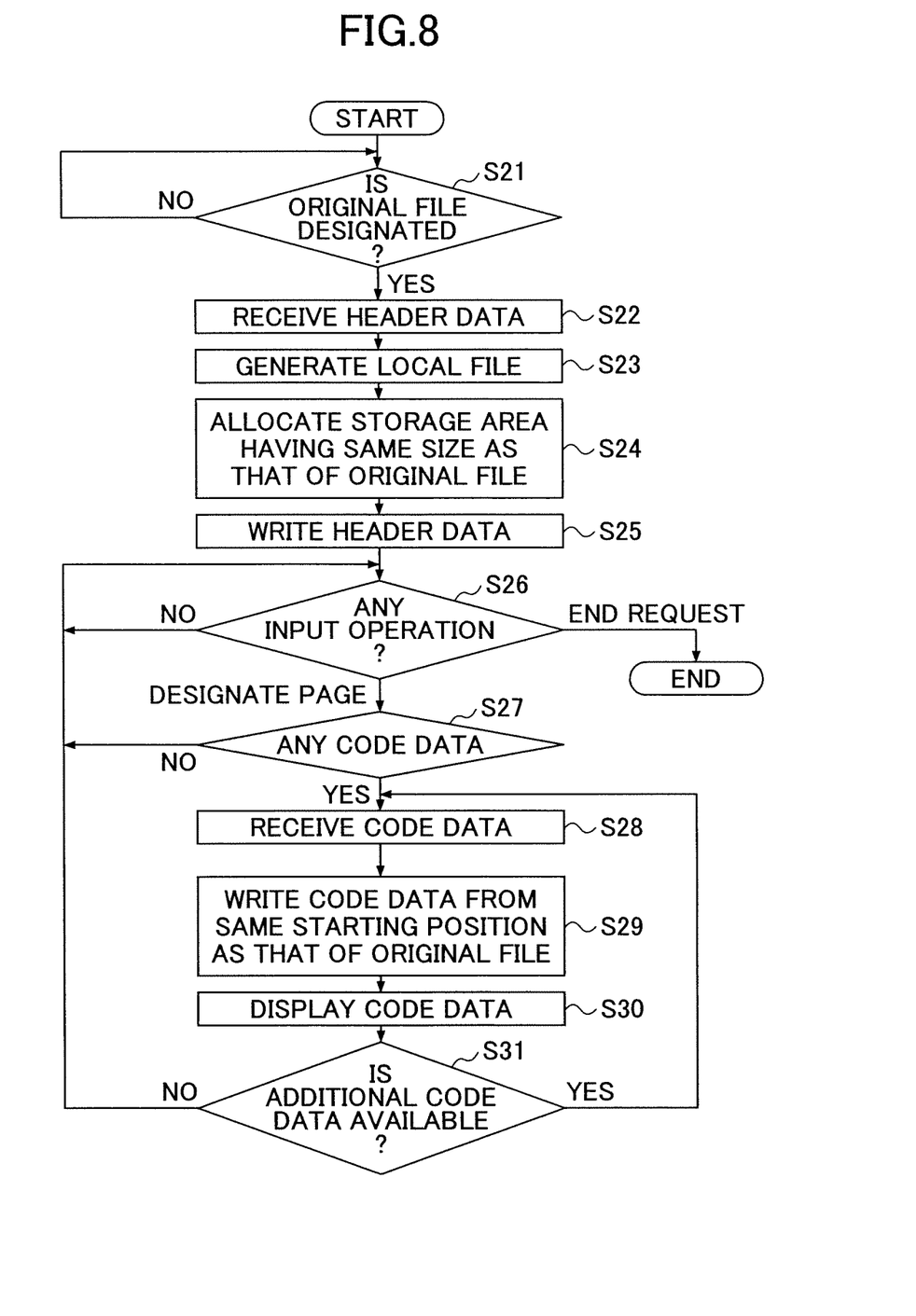
FIG. 8 is a flowchart showing the operations of the file access system according to the second embodiment of the present invention.

Next, the operations of the file access system 51 are described with respect to FIG. 8.

First, one original file is designated from among the files in the server apparatus 2 via the input device 24 or the like (step S21). Then, the header data receiving unit 11 sends a request to the server apparatus 2 to transmit the header data of the designated original file, and receives the header data from the server apparatus 2 as the response to the request (step S22).

Next, the header data writing unit 52 generates a local file in the file storage unit 10 (step S23). Then, the storage area allocating unit 55 allocates the storage area in the local file in the file storage unit 10 so that the storage area has the same size as that of the original file (step S24).

Next, the header data writing unit 52 writes the header data received by the header data receiving unit 11 into the local file in the file storage unit 10 (step S25).

Next, the input device 24 is operated (step S26). When the operation is to end, the operation of the file access system 51 terminates. On the other hand, when the operation is to designate a page, the code data receiving unit 13 determines whether the code data corresponding to the designated page is available (step S27).

When it is determined that the code data is not available, the process goes to step S26 to wait for the next operation. On the other hand, when it is determined that the code data is available in step S27, the code data receiving unit 13 sends a request to the server apparatus 2 to transmit the code data corresponding to the designated page, and receives the code data from the server apparatus 2 as the response to the request (step S28). Then the received code data are stored in the local file in a manner so that the received data are stored from the same starting position of the local file as that of the original file (step S29).

After the code data received by the code data receiving unit 13 have been stored, the code data are decoded by the CPU 20, a video card (not shown), or the like, and displayed on the display device 25 (step S30).

Then, the code data receiving unit 13 determines whether there are additional code data corresponding to the designated page (step S31). When it is determined that there are additional code data, the operation of the file access system 51 goes back to step S28 to receive the next code data by the code data receiving unit 13. When it is determined that there are no additional code data, the operation of the file access system 51 goes back to step S26 to wait for the next operation of the input device 24.

Figure 9:
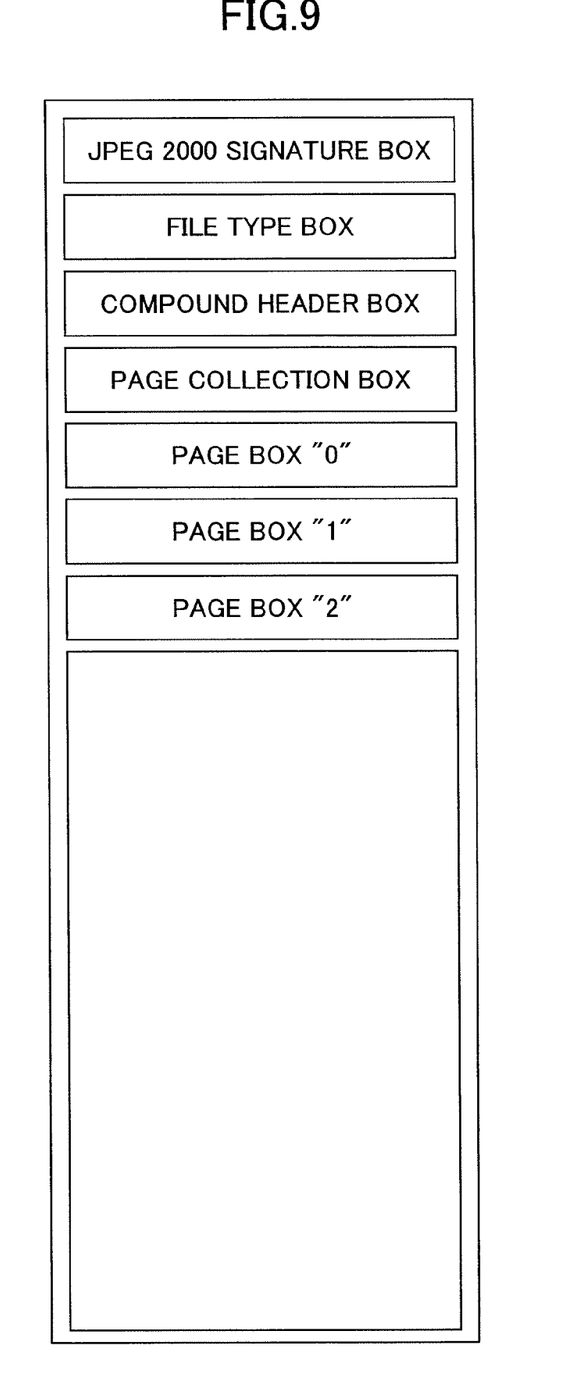
FIG. 9 is a configuration diagram showing a first state of a local file updated by the file access system according to the second embodiment of the present invention.

In the local file where, for example, the header information with respect to the original file shown in FIG. 3 is stored, the storage area for storing the code streams "0" through "3" is allocated as shown in FIG. 9.

Figure 10:
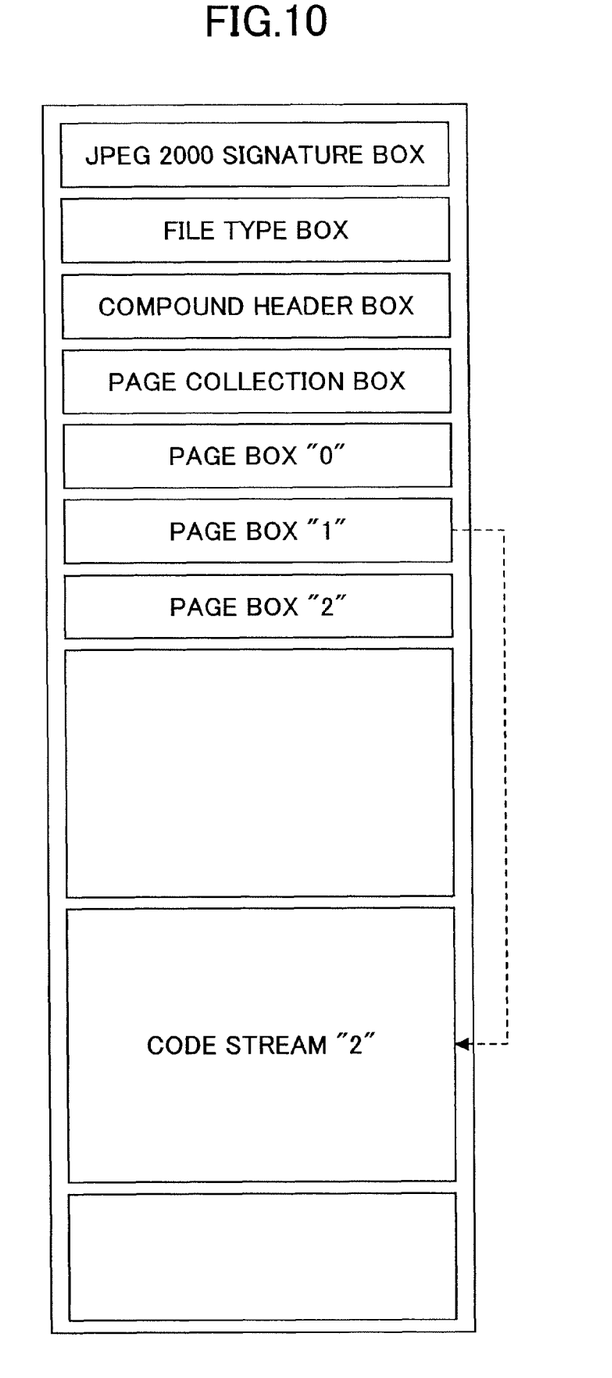
FIG. 10 is a configuration diagram showing a second state of the local file updated by the file access system according to the second embodiment of the present invention.

Next, a case is described where a second page (page box "1") is designated. In this case, in the local file, as shown in FIG. 10, the code stream "2" corresponding to the page box "1" is stored in the storage area beneath the storage area allocated for storing the code streams "0" and "1".

As described above, advantageously, in the file access system 51, each of the received code data may be stored from the same starting position of the local file as that of the original file. Because of this feature, it becomes unnecessary to update the contents of the information items indicating the starting position and the size of each code data included in the header data upon receiving the code data and to shift the code data that has been replaced, thereby enabling controlling the increase of the processing time upon receiving code data as the number of received code data is increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A file access system capable of being connected to a server apparatus storing an original file including plural code data and header data having information items indicating the starting position and the size of the corresponding code data, and receiving each of the code data from the server apparatus and updating a local file, the file access system comprising:
    a header data receiving unit to receive the header data;
    a header data writing unit to write the header data into the local file;
    a code data receiving unit to receive designated code data from among the code data;
    a storage area allocating unit to, for each received code data,
        determine whether storage area allocated for the local file enables a received code data to be fully written to the local file from a starting position relative to a beginning of the local file that is the same as that of a starting position of a corresponding code data located in the original file relative to a beginning of the original file, and
        allocate a storage area with respect to the local file when the local file does not enable the received code data to be fully written by expanding a size of the local file so that the received code data received by the code data receiving unit is written in the local file from the starting position that is the same as that of the starting position of the corresponding code data located in the original file relative to the beginning of each of the local and original files; and
    a code data writing unit to write each of the received code data from the same starting position of the local file.

2. The file access system according to claim 1, further comprising:
    an allocation area determining unit to determine whether a necessary storage area is allocated in the local file so that the code data writing unit can write the code data into the storage area, wherein
    when the allocation area determining unit determines that necessary storage area is not allocated with respect to the local file, the storage area allocating unit allocates the storage area of the local file so that the ending position of the code data of the local file is the same as that of the code data of the original file.

3. The file access system according to claim 1, wherein after the header data receiving unit receives the header data, the storage area allocating unit allocates the storage area with respect to the local file so that the size of the local file is the same as that of the original file.

4. The file access system according to claim 1, wherein the original file is a JPEG 2000 file.

5. The file access system according to claim 2, wherein the original file is a JPEG 2000 file.

6. The file access system according to claim 3, wherein the original file is a JPEG 2000 file.

7. A file access method of receiving code data from a server apparatus storing an original file including plural code data and header data having information items indicating the starting position and the size of the corresponding code data, and updating a local file, the file access method comprising:
  receiving the header data;
  writing the header data into the local file;
  receiving designated code data from among the code data;
  for each received code data, determining whether storage area allocated for the local file enables a received code data to be fully written to the local file from a starting position relative to a beginning of the local file that is the same as that of a starting position of a corresponding code data located in the original file relative to a beginning of the original file;
  allocating a storage area with respect to the local file when the local file does not enable the received code data to be fully written by expanding a size of the local file so that the received code data received in the code data receiving step is written in the local file from the starting position that is the same as that of the starting position of the corresponding code data located in the original file relative to the beginning of each of the local and original files; and
  writing each of the received code data from the same starting position of the local file.

* * * * *